2 Sheets--Sheet 1.

H. CARSTAEDT.

Take-Up Mechanism for Looms Weaving Irregular Fabrics

Figure 1:
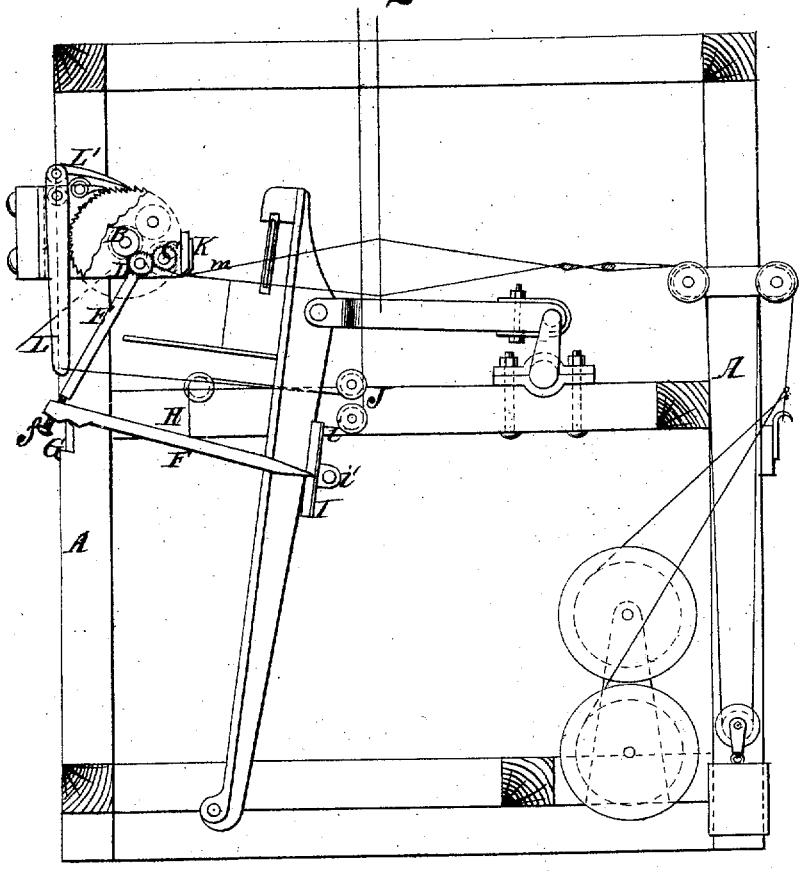

No. 5,150. Fig. 1. Reissued Nov. 19, 1872.

Witnesses.
Chas. Wahlers.
Ernst Bilhuber.

Inventor.
Hugo Carstaedt
p.
Van Santvoord & Hauff
Attys

AM. PHOTO-LITHOGRAPHIC CO. N.Y. (OSBORNE'S PROCESS.)

2 Sheets--Sheet 2.

H. CARSTAEDT.

Take-Up Mechanism for Looms Weaving Irregular Fabrics.

No. 5,150. Reissued Nov. 19, 1872.

Witnesses.
Chas. Wahlers.
Ernst Bilsinber.

Inventor.
Hugo Carstaedt
by
Van Santvoord & Hauff
Attys

A.M. PHOTO-LITHOGRAPHIC CO. N.Y. (OSBORNE'S PROCESS.)

UNITED STATES PATENT OFFICE.

HUGO CARSTAEDT, OF NEW YORK, N. Y.

IMPROVEMENT IN TAKE-UP MECHANISMS FOR LOOMS FOR WEAVING IRREGULAR FABRICS.

Specification forming part of Letters Patent No. 88,365, dated March 30, 1869; reissue No. 5,150, dated November 19, 1872.

*To all whom it may concern:*

Be it known that I, HUGO CARSTAEDT, of the city, county, and State of New York, have invented a new and useful Improvement in Take-Up Mechanism for Looms for Weaving Irregular Fabrics; and I do hereby declare the following to be a full, clear, and exact description thereof, which will enable those skilled in the art to make and use the same, reference being had to the accompanying drawing forming part of this specification, in which drawing—

Figure 2:
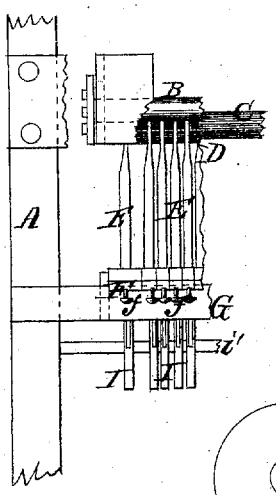
Figure 4:
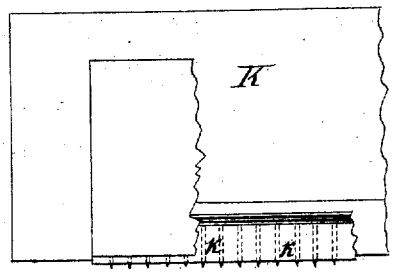
Figure 3:
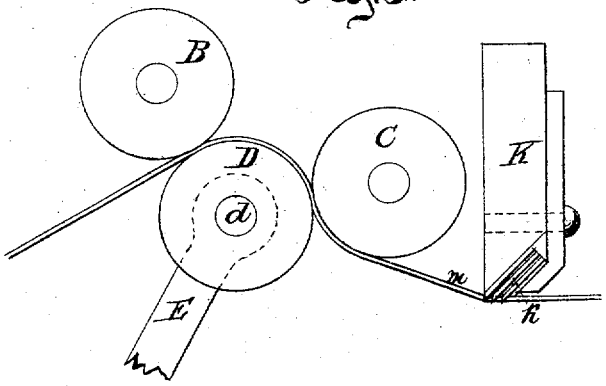

Figure 1 is a vertical section. Fig. 2 is a portion of a front view, part of the loom being broken away to better show the interior. Fig. 3 represents a cross-section of a part. Fig. 4 is a front view of a part.

Similar letters indicate corresponding parts.

This invention consists in a sectional take-up composed of two rolls, continuously rotating at a suitable distance apart, and a series of sectional rollers mounted and operated so as to be pressed wedgewise between the two first-named rolls when the take-up is to act; also, in a series of needles or points arranged on a stationary bar in such relation to the take-up rollers that the fabric is continually carried across said needles to be received by their points, and to be arrested when a reverse motion of any part of said fabric is commenced; further, in the combination of a series of needles with a take-up composed of rollers or wheels D, arranged to take up at intervals on parts of the work, and to liberate other parts, so that as the fabric or any part thereof is carried in by the take-up it is withdrawn from the needles, but the needles prevent the fabric or any part thereof from moving back; also, in combining with the sectional take-up rollers a lever which acts on said rollers with a yielding force, and which is retained at the proper moment by a holder so as to render the take-up rollers self-adjusting.

Referring to the drawing, B and C are rollers, continuously but slowly rotated by gearing, as indicated. The woven fabric, represented by *m*, is led under each of these, and between them and short rollers or wheels, which are peculiarly mounted below. The cloth is taken up or drawn forward by being pinched between the wheels D and the rollers B C, and the former are pressed up so as to take hold of the cloth firmly, or are let down so as to liberate it, according as the work requires. When all the wheels D are pressed up the woven fabric is taken up uniformly over its whole breadth. When the rollers D on one side of the cloth are pressed up, and the rollers D on the other side are allowed to remain depressed, the cloth will be taken up only on the side where the cloth is pinched. The rollers D are mounted in pairs on the rods E. The rods E are supported on the adjusting-screws *f* in the levers F, which turn on a fixed cross-bar or knife-edge, G. The arms of the lever F are unequal, and the gravity of the longest arm tends to lift the rod E and the pair of wheels D mounted thereon. So long as it is desired to take up the cloth the pair of wheels D is pressed up by the weight of the lever F with a yielding force just sufficient to insure a correct performance of the work, and which is self-adjusting, the lever tilting more or less as may be required, according to the varying thickness of the cloth, or the gradual wear or maladjustment of the parts. When it is desired to liberate this part of the cloth, and thus suspend the take-up action thereon, the heavy end of the lever F is lifted by the string H, operated by the Jacquard or by other suitable means. After having been once lifted to the proper extent it is held up by the holder I, which turns on the center *i*, and receives the pointed end of the lever F in the hole *i*, and supports it, as will be obvious, so long as the parts are allowed to remain in this position, whether the string H be constantly strained or not. So soon as it is desired to bring this part of the take-up mechanism again into play the string H is loosened, if it has not been previously done, and the holder I is tilted by a pull on the string J, which pull is effected by the Jacquard or by other suitable means. The pull on the string J tilts the holder I and releases the heavy and pointed end of the lever F, which immediately descends by gravity and elevates the rod E and the corresponding pair of wheels D into tight contact with the cloth again, and the cloth, being now tightly pinched within the wheels D and the rollers B and C, commences to be taken up. By providing a sufficient number of the wheels D, rods E, levers F, screws *f*, holders I, and strings or cords H and J with the corresponding Jacquard mechanism properly arranged for operating them, I am able to take up, in the weaving of corsets or other irregular work, with great certainty and precision. K is a cross-bar immediately behind the roller C, and provided with a series of needles, *k*, in its lower edge, which catch in the goods and prevent its being drawn back under any circumstances when the take-up mechanism releases it. The other portion of the mechanism will be understood without minute description. The several parts are sustained on the frame-work A, and the working parts of the loom as well as the take-up may be of any approved character.

For the purpose of operating the take-up, if a sectional take-up is used, I prefer the mechanism represented, in which the lever L operating the pawl L′ is struck by each blow of the lay, and moved sufficiently to give a proper motion to the large ratchet-wheel represented on the end of the shaft B. By providing an adjustment to determine how far these parts may return after each blow, the rate at which the take-up mechanism will operate when in action may be graduated with great nicety. The let-off may be controlled by friction and weights, as represented, or there may be various modifications and refinements introduced therein. In short, my improved take-up may be used in connection with any kind of mechanism for performing the other parts of the work.

I esteem it important in irregular weaving to have the take-up as near as possible to the place where the weaving is performed—in other words, to the line where the reed strikes the weft. My needles *k*, arranged in the position represented, effect all this, and also serve to guard the woven fabric against being drawn to one side or the other by the oblique and irregular tension of the take-up. The rollers B and C, as also the wheels D, may be fluted or otherwise roughened, if preferred; or they may be covered with rubber or other strongly-frictional material. Power may be applied to the wheels D by any suitable connecting mechanism, if preferred, in any very nice work. But I consider it sufficient in ordinary cases to rotate the rollers B and C by power and to leave the wheels D free.

It will be readily understood that the levers F drop on being released from the holders I to various extents, so as in every case to press with their full force strongly and evenly upon the cloth. In case the cloth is thicker or thinner the levers F drop to a greater or less extent, and the wear of the center *d* on which the wheels D turn, as also the wear of the point of the screw *f* and of the knife-edge G, is all compensated for by the greater descent of the lever F. Turning the screws *f* adjusts these levers at will, so as to keep them approximately together when their gravity is thus operating.

It will be seen that the construction of the holders I and the position of the centers *i′* on which they turn causes their gravity to incline their tops forward, so as to promptly catch their respective levers F. Springs may be used to assist in place of the gravity of the holders I, if preferred.

It will be observed that the position or arrangement of the movable sectional roller or series of rollers D in being pressed up to seize and take up the fabric at any point, seize the fabric not alone by pinching it along one line, but along two lines, one line being in the plane between the axes of the rolls D and B, and the other line being in the plane between the axes of the rolls D and C. This duplication of the pinching increases the effect of the hold upon the goods and tends to prevent slipping.

It will further be observed, and to this I attach much importance, that the movable rolls are pressed up partially between the rolls B and C, and thereby causing one to serve as an abutment for the other, and to give a greater pressure on the goods with a given force applied through the rods E than would be otherwise obtainable.

The rolls B and C also serve by this arrangement as guides or supports for the rolls D in front and rear, and avoid the necessity for other guides at or near the top.

What I claim as new, and desire to secure by Letters Patent, is—

1. The two rolls B and C, continuously rotating at a suitable distance apart, and the series of sectional rollers or wheels D, mounted and operated so as to be pressed wedgewise between them when the take-up is to act, all substantially as and for the purpose herein set forth.

2. The needles or points *k k* fixed on a stationary bar, K, and arranged, as specified, so that the fabric being drawn by the take-up proper is continually carried across the needles, to be received by their points and to be arrested when a reverse movement of any part of said fabric is commenced, substantially as herein set forth.

3. A series of needles, *k k*, in combination with a take-up, composed of rollers or wheels D, arranged to take up at intervals on parts of the work, and to liberate other parts, substantially as and for the purpose herein specified.

4. The levers F supported by the holder I, and released therefrom, as and for the purposes herein set forth.

HUGO CARSTAEDT.

Witnesses:

W. HAUFF,

E. F. KASTENHUBER.